(12) United States Patent
Yamada

(10) Patent No.: US 12,730,213 B2
(45) Date of Patent: Sep. 8, 2026

(54) DISTANCE MEASUREMENT APPARATUS AND SETTING METHOD OF TRANSMISSION CONDITION

(71) Applicant: ALPS ALPINE CO., LTD., Tokyo (JP)

(72) Inventor: Yukimitsu Yamada, Miyagi (JP)

(73) Assignee: ALPS ALPINE CO., LTD., Tokyo (JP)

(*) Notice: Subject to any disclaimer, the term of this patent is extended or adjusted under 35 U.S.C. 154(b) by 225 days.

(21) Appl. No.: 18/663,755

(22) Filed: May 14, 2024

(65) Prior Publication Data

US 2024/0295650 A1 Sep. 5, 2024

Related U.S. Application Data

(63) Continuation of application No. PCT/JP2022/038191, filed on Oct. 13, 2022.

(30) Foreign Application Priority Data

Dec. 7, 2021 (JP) ................................ 2021-198604

(51) Int. Cl.
*G01S 13/84* (2006.01)
*G01S 13/88* (2006.01)

(52) U.S. Cl.
CPC ............... *G01S 13/84* (2013.01); *G01S 13/88* (2013.01)

(58) Field of Classification Search
None
See application file for complete search history.

(56) References Cited

U.S. PATENT DOCUMENTS 5,596,330 A * 1/1997 Yokev .................. H04B 7/2681 342/465
6,859,761 B2 * 2/2005 Bensky .................. G01S 13/84 702/189

(Continued)

FOREIGN PATENT DOCUMENTS

| | | |
|---|---|---|
| JP | 2019-128341 | 8/2019 |
| JP | 2020-509261 | 3/2020 |
| WO | 2020/077231 | 4/2020 |

OTHER PUBLICATIONS

Japanese Office Action for 2023-566113 mailed on Oct. 8, 2024.
International Search Report for PCT/JP2022/038191 mailed on Dec. 13, 2022.

*Primary Examiner* — Bernarr E Gregory
(74) *Attorney, Agent, or Firm* — IPUSA, PLLC

(57) ABSTRACT

A distance measurement apparatus executes transmitting and receiving a signal with another device; acquiring first and second phases when the other device receives signals of first and second frequencies from the distance measurement apparatus; measuring third and fourth phases when the signals of first and second frequencies are received from the other device; measuring a distance to the other device based on the acquired first and second phases, the first and second frequencies, and the measured third and fourth phases; and setting randomly a transmission order, and the first and second frequencies. The transmission order indicates an order of transmitting the signal of the first frequency by the other device, transmitting the signal of the first frequency by the distance measurement apparatus, transmitting the signal of the second frequency by the other device, and transmitting the signal of the second frequency by the distance measurement apparatus.

7 Claims, 6 Drawing Sheets

(56) References Cited

U.S. PATENT DOCUMENTS

| | | | | |
|---|---|---|---|---|
| 6,868,073 | B1 * | 3/2005 | Carrender | G01S 13/84 370/278 |
| 6,898,415 | B2 * | 5/2005 | Berliner | H04B 7/005 455/501 |
| 11,560,121 | B2 * | 1/2023 | Ootaka | G01S 13/84 |
| 11,573,315 | B2 * | 2/2023 | Ootaka | G01S 13/84 |
| 2002/0094786 | A1 * | 7/2002 | Berliner | H04B 1/7156 455/260 |
| 2003/0195723 | A1 | 10/2003 | Bensky et al. | |
| 2005/0237953 | A1 * | 10/2005 | Carrender | G01S 13/84 370/278 |
| 2011/0148710 | A1 * | 6/2011 | Smid | G01S 13/84 342/394 |
| 2016/0003932 | A1 | 1/2016 | Whitney et al. | |
| 2019/0187262 | A1 | 6/2019 | Moe et al. | |
| 2019/0227141 | A1 | 7/2019 | Nishikawa | |
| 2021/0019433 | A1 | 1/2021 | Finkenzeller et al. | |
| 2022/0066019 | A1 * | 3/2022 | Waheed | G01S 13/84 |

* cited by examiner

FIG.3

SETTING DATA 001

| TRANSMISSION ORDER | TRANSMITTING DEVICE | RECEIVING DEVICE | FREQUENCY |
|---|---|---|---|
| 1 | 100A | 100B | f1 |
| 2 | 100B | 100A | f1 |
| 3 | 100B | 100A | f2 |
| 4 | 100A | 100B | f2 |
| 5 | 100A | 100B | f3 |
| 6 | 100B | 100A | f3 |
| 7 | 100B | 100A | f4 |
| 8 | 100A | 100B | f4 |
| ⋮ | ⋮ | ⋮ | ⋮ |

DISTANCE MEASUREMENT APPARATUS AND SETTING METHOD OF TRANSMISSION CONDITION

CROSS-REFERENCE TO RELATED APPLICATION

The present application is a continuation application of International Application No. PCT/JP2022/038191 filed on Oct. 13, 2022, which is based on and claims priority to Japanese Patent Application No. 2021-198604 filed on Dec. 7, 2021. The contents of these applications are incorporated herein by reference in their entirety.

BACKGROUND OF THE INVENTION

1. Field of the Invention

The present invention relates to a distance measurement apparatus and a setting method of a transmission condition.

2. Description of the Related Art

Conventionally, there is a distance measurement apparatus including a first device including a first transmitting device/receiving device configured to transmit a first known signal corresponding to a first carrier frequency and a second known signal corresponding to a second carrier frequency different from the first carrier frequency and configured to receive a third known signal corresponding to the first carrier frequency and a fourth known signal corresponding to the second carrier frequency; a second device including a second transmitting device/receiving device configured to transmit the third known signal and the fourth known signal and to receive the first known signal and the second known signal; and a calculating unit configured to calculate a distance between the first device and the second device based on phases of the first to fourth known signals, wherein the first transmitting device/receiving device and the second transmitting device/receiving device perform transmitting/receiving a total of four times including transmitting/receiving the first and third known signals one time each and transmitting/receiving the second and fourth known signals one time each (see, for example, patent document 1).

[Patent Document 1] Japanese Laid-open Patent Publication No. 2019-128341

SUMMARY OF THE INVENTION

According to one aspect of the present invention, there is provided a distance measurement apparatus including a processor; a memory storing one or more programs, which when executed, cause the processor to execute transmitting a signal to another device; receiving a signal from the other device; acquiring a first phase when the other device receives a signal of a first frequency transmitted to the other device by the distance measurement apparatus, and a second phase when the other device receives a signal of a second frequency transmitted to the other device by the distance measurement apparatus; measuring a third phase when the signal of the first frequency is received from the other device by the distance measurement apparatus, and a fourth phase when the signal of the second frequency is received from the other device by the distance measurement apparatus; measuring a distance to the other device based on the acquired first phase and the acquired second phase, the first frequency, the measured third phase and the measured fourth phase, and the second frequency; and setting randomly a transmission order, the first frequency, and the second frequency, the transmission order indicating an order of transmitting the signal of the first frequency by the other device, transmitting the signal of the first frequency by the distance measurement apparatus, transmitting the signal of the second frequency by the other device, and transmitting the signal of the second frequency by the distance measurement apparatus.

BRIEF DESCRIPTION OF THE DRAWINGS

FIG. 3 illustrates an example of setting data;

DETAILED DESCRIPTION OF THE PREFERRED EMBODIMENTS

Although the conventional distance measurement apparatus is applicable to a smart key entry system of a vehicle and provides countermeasures against what is referred to as a relay attack, the secrecy of the communication is not sufficient because the apparatus on the vehicle side and the smart key communicate according to a predetermined fixed transmission order and transmission frequency. That is, the countermeasures against the relay attack are not sufficient.

Therefore, it is an object of the present invention to provide a distance measurement apparatus which improves the secrecy of communication and a setting method of a transmission condition.

Hereinafter, a distance measurement apparatus and a method for setting transmission conditions according to an embodiment of the present invention will be described.

Embodiment

Figure 1:
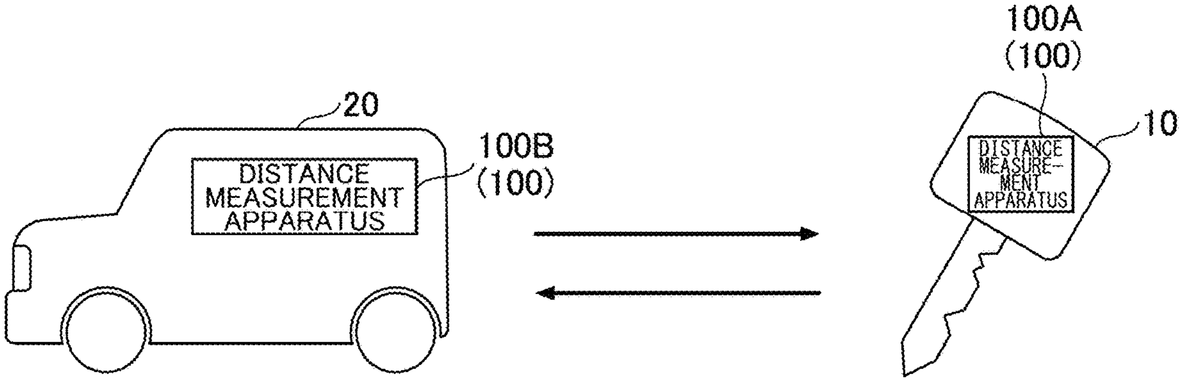
FIG. 1 is a diagram illustrating a smart key and a vehicle mounted with distance measurement apparatuses of the embodiment, respectively.

FIG. 1 is a diagram illustrating a smart key 10 and a vehicle 20 mounted with distance measurement apparatuses 100A and 100B of the embodiment, respectively. Here, as an example, a configuration in which the distance measurement apparatus 100A is mounted in the smart key 10 of the vehicle 20 and the distance measurement apparatus 100B is mounted in a smart entry system mounted in the vehicle 20 will be described. As an example, the distance measurement apparatuses 100A and 100B perform packet communication by using BLE (Bluetooth Low Energy) (registered trademark).

At least one of the distance measurement apparatus 100A of the smart key 10 or the distance measurement apparatus 100B of the vehicle 20 measures the distance between the smart key 10 and the vehicle 20, and the lock of the door, trunk, or the like of the vehicle 20 is unlocked when the distance measured by the distance measurement apparatus 100A or 100B is an appropriate distance.

Here, as an example, the distance measurement apparatus 100A of the smart key 10 measures the distance and reports, to the distance measurement apparatus 100B of the vehicle 20, the result of the distance measurement. The distance measurement apparatuses 100A and 100B have the same configuration as an example. Therefore, in the following, when the distance measurement apparatuses 100A and 100B are not distinguished, these are simply referred to as the distance measurement apparatus 100. Among the distance measurement apparatus 100A of the smart key 10 and the distance measurement apparatus 100B of the vehicle 20, the distance measurement apparatus 100B that does not perform distance measurement is an example of another device. In this example, the distance measurement apparatus 100B of the vehicle 20 is an example of another device.

<Configuration of the Distance Measurement Apparatus 100A>

Figure 2:
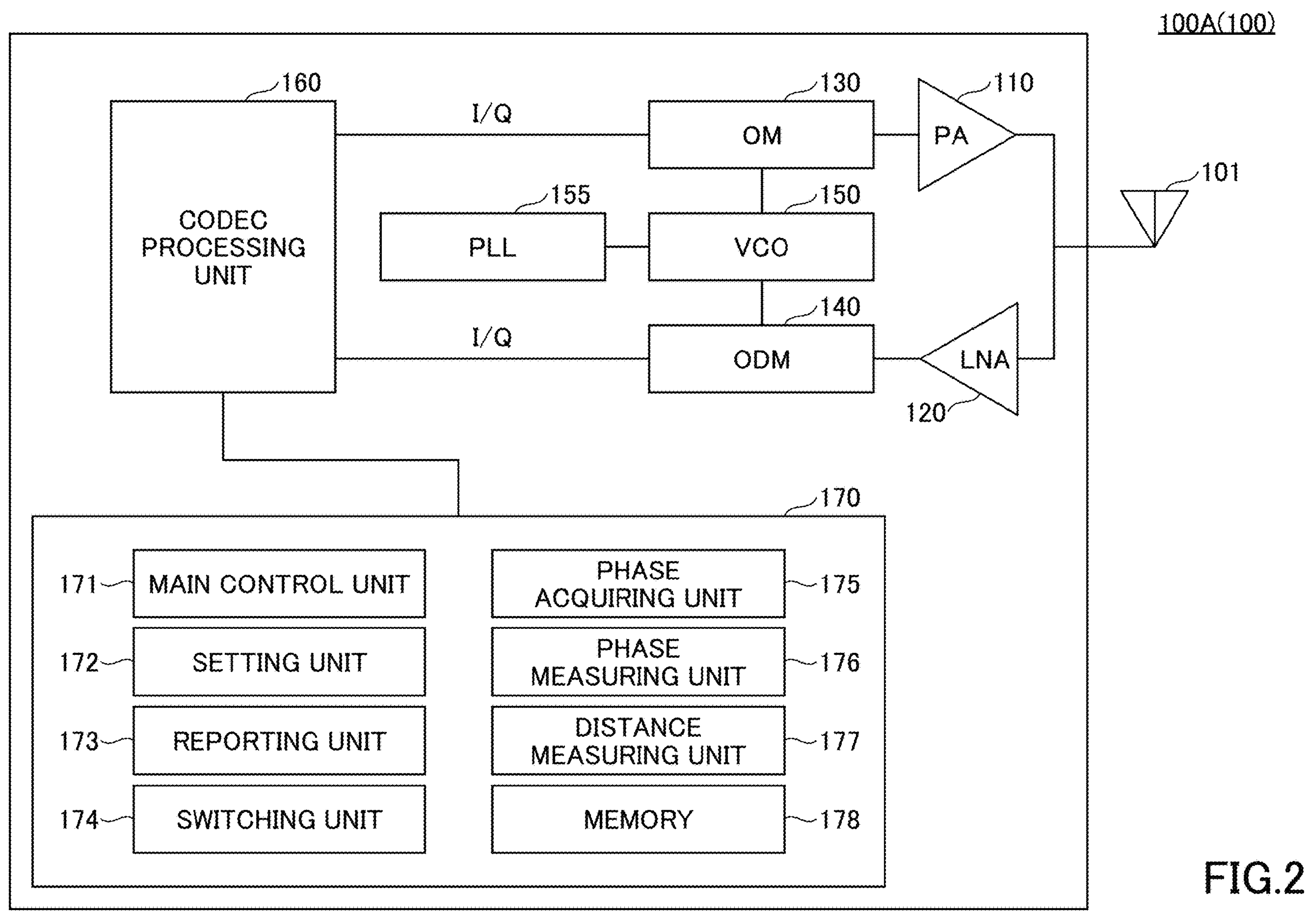
FIG. 2 is a diagram illustrating the distance measurement apparatus of the embodiment.

FIG. 2 is a diagram illustrating the distance measurement apparatus 100A of the embodiment. As described above, the distance measurement apparatus 100A of the smart key 10 and the distance measurement apparatus 100B of the vehicle 20 have the same configuration. The distance measurement apparatus 100A for performing the distance measurement will now be described.

The distance measurement apparatus 100A includes an antenna 101, a PA (Power Amplifier) 110, a LNA (Low Noise Amplifier) 120, an OM (Orthogonal Modulator) 130, an ODM (Orthogonal DeModulator) 140, a VCO (Voltage Controlled Oscillator) 150, a PLL (Phase Locked Loop) 155, a codec processing unit 160, and a control device 170.

The antenna 101 communicates with the antenna 101 of the distance measurement apparatus 100B of the vehicle 20. The antenna 101 is connected to the PA 110 and the LNA 120. Here, a switching switch for switching the connection destination of the antenna 101 to one of the PA 110 and the LNA 120 is omitted.

The PA 110 is provided between the OM 130 and the antenna 101, and amplifies the modulation signal for transmission input from the OM 130 and outputs the signal to the antenna 101. The PA 110 is an amplifier for transmission.

The LNA 120 is provided between the antenna 101 and the ODM 140, and amplifies the radio wave received by the antenna 101 with low noise and outputs the radio wave to the ODM 140. The LNA 120 is an amplifier for reception.

The OM 130 is an example of a transmission unit that modulates an I/Q signal input from the codec processing unit 160, by using a high-frequency signal input from the VCO 150, and outputs the signal to the PA 110 as a modulation signal for transmission.

The ODM 140 is an example of a receiving unit, which demodulates a received signal output from the LNA 120 by using a high-frequency signal input from the VCO 150 to acquire an I/Q signal, and outputs the I/Q signal to the codec processing unit 160.

The VCO 150 oscillates at a frequency set by the PLL 155. The VCO 150 can oscillate at a plurality of frequencies set by the PLL 155.

The PLL 155 sets the frequency at which the VCO 150 oscillates. The PLL 155 can set a plurality of frequencies to the VCO 150.

The codec processing unit 160 includes an ADC (Analog to Digital Converter) and a DAC (Digital to Analog Converter) and performs codec processing. The codec processing unit 160 performs detection of BLE packets, address determination processing, and the like. More specifically, the codec processing unit 160 performs digital conversion (ADC processing) of the I/Q signal processed by the ODM 140 and converts the signal into BLE (registered trademark) packet information. Further, the codec processing unit 160 generates an I/Q signal (split into I and Q signals) from the BLE packet signal (digital signal) input from the control device 170, performs analog conversion on the signal by DAC processing, and outputs the signal to the OM 130 as an I/Q signal as a transmission signal.

The control device 170 includes a main control unit 171, a setting unit 172, a reporting unit 173, a switching unit 174, a phase acquiring unit 175, a phase measuring unit 176, a distance measurement apparatus 177, and a memory 178. The memory 178 is an example of a storage unit. The control device 170 is implemented by a microcomputer including a CPU (Central Processing Unit), a RAM (Random Access Memory), a ROM (Read Only Memory), an I/O interface, an internal bus, and the like.

The main control unit 171, the setting unit 172, the reporting unit 173, the switching unit 174, the phase acquiring unit 175, the phase measuring unit 176, and the distance measurement apparatus 177 indicate the functions of the program executed by the control device 170 as functional blocks. The memory 178 functionally represents the memory of the control device 170.

The main control unit 171 is a processing unit that controls the processing of the control device 170, and executes processing other than the processing executed by the setting unit 172, the reporting unit 173, the switching unit 174, the phase acquiring unit 175, the phase measuring unit 176, and the distance measurement apparatus 177.

The setting unit 172 randomly sets the transmission order with respect to the transmission of the signal of the first frequency from the distance measurement apparatus 100A to the distance measurement apparatus 100B, the transmission of the signal of the first frequency from the distance measurement apparatus 100B to the distance measurement apparatus 100A, the transmission of the signal of the second frequency from the distance measurement apparatus 100A to the distance measurement apparatus 100B, and the transmission of the signal of the second frequency from the distance measurement apparatus 100B to the distance measurement apparatus 100A; and the first and second frequencies. The transmission order and the first and second frequencies represent the transmission conditions in the method of setting the transmission conditions. The method of setting the transmission conditions in the embodiment is the method of setting the transmission conditions in the distance measurement apparatuses 100A and 100B.

Here, as an example, it is assumed that setting data, in which the transmission order with respect to the transmission of the signal of the first frequency from the distance measurement apparatus 100A to the distance measurement apparatus 100B, the transmission of the signal of the first frequency from the distance measurement apparatus 100B to the distance measurement apparatus 100A, the transmission of the signal of the second frequency from the distance measurement apparatus 100A to the distance measurement apparatus 100B, and the transmission of the signal of the second frequency from the distance measurement apparatus 100B to the distance measurement apparatus 100A; and the first frequency and the second frequency are randomly set, is stored in the memory 178 of the distance measurement apparatuses 100A and 100B.

The same plurality of pieces of setting data are stored in the memory 178 of the distance measurement apparatuses 100A and 100B, and as an example, the reporting unit 173 of the distance measurement apparatus 100A reports, to the reporting unit 173 of the distance measurement apparatus 100B, the ID (Identifier) of the setting data to be used for distance measurement. The distance measurement apparatus 100B that has received the report reads the setting data from the memory 178 by using the ID and uses the setting data for communication for distance measurement. In this way, the distance measurement apparatuses 100A and 100B share the setting data.

The setting unit 172 sets the transmission order and the frequency by reading the setting data from the memory 178. The process performed by the setting unit 172 of reading the setting data and setting the transmission order and the frequency, is one form of randomly setting the transmission order and the first and second frequencies by the setting unit 172.

The setting unit 172 may randomly determine the transmission order and the first and second frequencies, and set the determined transmission order and the first and second frequencies as the transmission order and frequencies of the distance measurement apparatuses 100A and 100B. In order to randomly set the transmission order and frequency, for example, a random number generator, a pseudo random generator, or the like may be used to randomly set the transmission order and to randomly set the frequency among a plurality of previously prepared frequencies. For the plurality of previously prepared frequencies, a plurality of tables in which the order of the frequencies is described may be prepared in advance, and one of the tables may be selected and used. In order to be able to use a common table in the setting unit 172 of the distance measurement apparatuses 100A and 100B, information for specifying one of the tables may be shared in the packet communication of BLE.

The reporting unit 173 reports at least the ID of the setting data to the reporting unit 173 of the distance measurement apparatus 100B and reports the result of the distance measurement to the reporting unit 173 of the distance measurement apparatus 100B of the vehicle 20. For these reports, BLE packet communication of a frequency different from the communication for distance measurement is used. In the report, the ID of the setting data and the result of distance measurement can be written in the payload of the BLE packet.

The switching unit 174 switches between a transmission state in which the OM 130 transmits a signal and a reception state in which the ODM 140 receives a signal. The switching unit 174 enables the PA 110 to amplify the signal in the transmission state and enables the LNA to amplify the signal in the reception state. The switching unit 174 provides a stabilization time for stabilizing the phase and frequency when switching between the transmission state and the reception state.

The phase acquiring unit 175 acquires, from the distance measurement apparatus 100B, the first phase P1 when the distance measurement apparatus 100B receives the signal of the first frequency transmitted by the distance measurement apparatus 100 A, and acquires the second phase P2 when the distance measurement apparatus 100B receives the signal of the second frequency transmitted by the distance measurement apparatus 100A. The phase acquiring unit 175 acquires the first phase P1 and the second phase P2 from the distance measurement apparatus 100B in the packet communication of BLE of a frequency different from the communication for distance measurement. The first phase P1 and the second phase P2 may be written in the payload of the packet of BLE.

The phase measuring unit 176 measures the third phase P3 when the distance measurement apparatus 100A receives the signal of the first frequency from the distance measurement apparatus 100B, and measures the fourth phase P4 when the distance measurement apparatus 100A receives the signal of the second frequency from the distance measurement apparatus 100B.

The distance measurement apparatus 177 measures the distance between the distance measurement apparatus 100A and the distance measurement apparatus 100B based on the first phase P1 and the second phase P2 acquired by the phase acquiring unit 175, the third phase P3 and the fourth phase P4 measured by the phase measuring unit 176, the first frequency, and the second frequency. The method of measuring the distance will be described later.

The memory 178 stores programs, data, etc., necessary for the main control unit 171, the setting unit 172, the reporting unit 173, the switching unit 174, the phase acquiring unit 175, the phase measuring unit 176, and the distance measurement apparatus 177 of the control device 170 to perform the aforementioned processing. The memory 178 stores setting data in which the aforementioned transmission order and the first and second frequencies are randomly set.

<Setting Data>

FIG. 3 is a diagram illustrating an example of setting data. FIG. 3 illustrates setting data of one of a plurality of pieces of setting data stored in the memory 178. The ID of the setting data illustrated in FIG. 3 is 001.

The setting data includes a transmission order, a transmitting device, a receiving device, and a frequency. One of the distance measurement apparatuses 100A and 100B becomes a transmitting device, and the other one becomes a receiving device, and the transmitting device transmits a signal to the receiving device. The transmission order indicates the order in which the transmitting device performs transmission. The frequencies are f1 to f4 as an example. Any one of the frequencies f1 to f4 is an example of a first frequency, and any other one of the frequencies f1 to f4 is an example of a second frequency.

A plurality of pieces of the above setting data are created and stored in the memory 178, and the reporting unit 173 of the distance measurement apparatus 100A reports, to the reporting unit 173 of the distance measurement apparatus 100B, the ID of the setting data used for communication by the distance measurement apparatuses 100A and 100B. In order to select one piece of setting data from the plurality of pieces of setting data, an ID may be selected in a predetermined order, or an ID may be selected by using a random number table or the like.

Further, when a plurality of pieces of setting data are generated in advance, when generating each piece of setting data, the transmission order may be randomly set by using, for example, a random number generator or a pseudo random generator, and the frequency may be randomly set from the plurality of frequencies prepared in advance. The setting unit 172 may read the setting data and set the transmission order and the frequency, and the setting method is as described above.

FIG. 3 illustrates the setting data whose ID is 001 among a plurality of pieces of setting data stored in the memory 178, and, therefore, for setting data whose ID is not 001, the transmission order and the frequency are different from those of the setting data illustrated in FIG. 3. In FIG. 3, as an example, the frequencies are set in the order of f1, f2, f3, and f4, such that the transmission order 1 and 2 are the frequency f1, the transmission order 3 and 4 are the frequency f2, the transmission order 5 and 6 are the frequency f3, and the transmission order 7 and 8 are the frequency f4, and this order is an example of a result of randomly setting the frequencies. Therefore, for example, the frequency may be set in the order of f4, f2, f1, f3, the frequency may be set in the order of f2, f4, f3, f1, the frequency may be set in the order of f3, f1, f4, f2, and the like. When the distance measurement apparatuses 100A and 100B transmit and receive at the same frequency (in this case, any one of f1 to f4), whether the distance measurement apparatuses 100A and 100B transmit first is also set in various orders by randomly setting the transmission order.

<Communication Method for Distance Measurement Executed by the Distance Measurement Apparatuses 100A and 100B>

Figure 4:
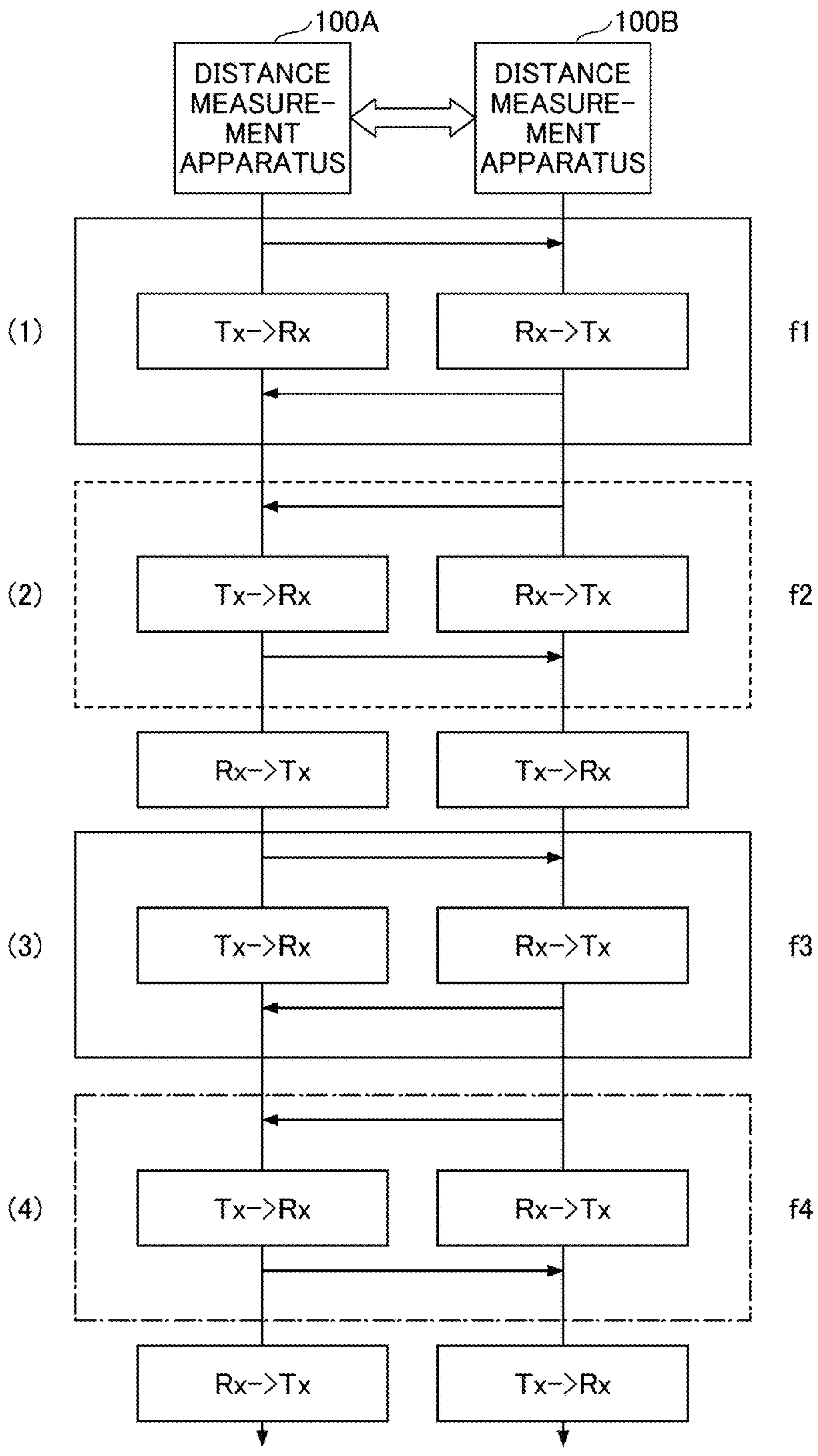
FIG. 4 illustrates a communication method for distance measurement executed by the distance measurement apparatuses.

FIG. 4 is a diagram for explaining a communication method for distance measurement executed by the distance measurement apparatuses 100A and 100B. Here, as an example, it is assumed that the setting unit 172 of the distance measurement apparatus 100A reads the setting data having the setting data ID 001 from the memory 178, sets the setting data, and transmits the setting data to the distance measurement apparatus 100B before starting communication for distance measurement. Therefore, the distance measurement apparatuses 100A and 100B share the same setting data before communicating for distance measurement. When the setting unit 172 of the distance measurement apparatus 100A reads the setting data whose ID is other than 001 from the memory 178, the distance measurement apparatuses 100A and 100B execute communication for distance measurement according to a combination of a transmission order and a frequency different from the combination of the transmission order and the frequency illustrated in FIG. 4. Here, as an example, a case in which communication is performed according to the setting data whose ID is 001 will be described.

The distance measurement apparatuses 100A and 100B transmit signals to each other at the same frequency in communication for distance measurement. More specifically, in communication for distance measurement, when one of the distance measurement apparatuses 100A and 100B transmits a signal at a certain frequency, the other one transmits the signal at the same frequency. Transmitting signals to each other in this way constitutes one communication in communication for distance measurement.

In FIG. 4, as an example, in the first communication (1), the distance measurement apparatus 100A transmits a signal to the distance measurement apparatus 100B at a frequency f1, and the distance measurement apparatus 100B transmits a signal to the distance measurement apparatus 100A at the same frequency f1. The phase acquiring unit 175 of the distance measurement apparatus 100A acquires, from the distance measurement apparatus 100B, the phase when the distance measurement apparatus 100B receives a signal at a frequency f1 transmitted by the distance measurement apparatus 100A. The phase measuring unit 176 of the distance measurement apparatus 100A measures the phase when the distance measurement apparatus 100A receives a signal at a frequency f1 from the distance measurement apparatus 100B.

In the second communication (2), the distance measurement apparatus 100B transmits a signal at a frequency f2 to the distance measurement apparatus 100A, and the distance measurement apparatus 100A transmits a signal at the same frequency f2 to the distance measurement apparatus 100B. The phase measuring unit 176 of the distance measurement apparatus 100A measures the phase when the distance measurement apparatus 100A receives a signal at a frequency f2 from the distance measurement apparatus 100B. The phase acquiring unit 175 of the distance measurement apparatus 100A acquires, from the distance measurement apparatus 100B, the phase when the distance measurement apparatus 100B receives the signal of the frequency f2 transmitted by the distance measurement apparatus 100A.

In the third communication (3), the distance measurement apparatus 100A transmits the signal to the distance measurement apparatus 100B at the frequency f3, and the distance measurement apparatus 100B transmits the signal to the distance measurement apparatus 100A at the same frequency f3. The phase acquiring unit 175 of the distance measurement apparatus 100A acquires, from the distance measurement apparatus 100B, the phase when the distance measurement apparatus 100B receives the signal at the frequency f3 transmitted by the distance measurement apparatus 100A. The phase measuring unit 176 of the distance measurement apparatus 100A measures the phase when the distance measurement apparatus 100A receives the signal at the frequency f3 from the distance measurement apparatus 100B.

In the fourth communication (4), the distance measurement apparatus 100B transmits the signal at the frequency f4 to the distance measurement apparatus 100A, and the distance measurement apparatus 100A transmits the signal at the same frequency f4 to the distance measurement apparatus 100B. The phase measuring unit 176 of the distance measurement apparatus 100A measures the phase when the distance measurement apparatus 100A receives the signal at the frequency f4 from the distance measurement apparatus 100B. The phase acquiring unit 175 of the distance measurement apparatus 100A acquires, from the distance measurement apparatus 100B, the phase when the distance measurement apparatus 100B receives the signal at the frequency f4 transmitted by the distance measurement apparatus 100A.

The communication for distance measurement illustrated in FIG. 4 is a communication in which the frequency and the transmission order are randomly set according to the setting data in which the frequency and the transmission order illustrated in FIG. 3 are randomly set. The distance measurement apparatuses 100A and 100B continue to perform the communication illustrated in FIG. 4 while the distance measurement is being performed, the phase measuring unit 176 of the distance measurement apparatus 100A measures the phase when the distance measurement apparatus 100A receives the signal from the distance measurement apparatus 100B, and the phase acquiring unit 175 of the distance measurement apparatus 100A acquires, from the distance measurement apparatus 100B, the phase when the distance measurement apparatus 100B receives the signal transmitted by the distance measurement apparatus 100A.

Although the distance measurement apparatuses 100A and 100B have their own unique reference clocks, a phase shift occurs in the reference clocks of the distance measurement apparatuses 100A and 100B when the reference clocks of the distance measurement apparatuses 100A and 100B are insufficiently synchronized.

If the first communication (1) to the fourth communication (4) is repeated with a short cycle of, for example, approximately 50 ms, the distance between the distance measurement apparatuses 100A and 100B can be considered to be the same (during these communications). In this case, the phase acquiring unit 175 of the distance measurement apparatus 100A sets the phase when the distance measurement apparatus 100B receives the signal of frequency fm transmitted by the distance measurement apparatus 100A, to $\varphi AB$. Further, the phase measuring unit 176 of the distance measurement apparatus 100A sets the phase when the distance measurement apparatus 100A receives the signal of frequency fm transmitted by the distance measurement apparatus 100B, to φBA. The frequency fm is, for example, one of the above-mentioned frequencies f1 to f4.

The notation of φAB+φBA indicates the total phase (phase of one reciprocation) of the reciprocating communication between the distance measurement apparatuses 100A and 100B at the frequency f. The phase of the reciprocating communication at the frequency fm is denoted as φ2w. 2w is an abbreviation of two-way (bidirectional). The phase of reciprocation in the first communication (frequency f1) is φ1w1, the phase of reciprocation in the second communication (frequency f2) is φ2w2, the phase of reciprocation in the third communication (frequency f3) is φ2w3, and the phase of reciprocation in the fourth communication (frequency f4) is φ2w4. The wavelengths at frequencies f1 to f4 are λ1 to λ4, respectively.

As described above, if the first communication (1) to the fourth communication (4) is repeated with a short cycle of approximately 50 ms as an example, the distance between the distance measurement apparatuses 100A and 100B is considered to be the same during the reciprocating communication. Therefore, if the distance between the distance measurement apparatuses 100A and 100B is L during the first communication (1) to the fourth communication (4), the following equations (1) to (4) are satisfied. The notation of 2L indicates the reciprocating distance. The notation of n indicates an integer greater than or equal to 1.

$$2L = (n + \varphi 2w1) \times \lambda 1 \quad (1)$$

$$2L = (n + \varphi 2w2) \times \lambda 2 \quad (2)$$

$$2L = (n + \varphi 2w3) \times \lambda 3 \quad (3)$$

$$2L = (n + \varphi 2w4) \times \lambda 4 \quad (4)$$

When n is eliminated from equations (1) and (2), the following equation (5A) is obtained, and when the equation is further transformed as in equations (5B) to (5D), the distance is obtained. The notation of c indicates the speed of light.

$$2L/\lambda 1 - \varphi 2w1 = 2L/\lambda 2 - \varphi 2w2 \quad (5A)$$

$$2L(1/\lambda 2 - 1/\lambda 1) = \varphi 2w2 - \varphi 2w1 \quad (5B)$$

$$2L(f2 - f1)/c = \varphi 2w2 - \varphi 2w1 \quad (5C)$$

$$L/c = (1/2) \times (\varphi 2w2 - \varphi 2w1)/(f2 - f1) \quad (5D)$$

Similarly, when n is eliminated from equations (1) and (3), the equation can be transformed as in equation (6).

$$L/c = (1/2) \times (\varphi 2w3 - \varphi 2w1)/(f3 - f1) \quad (6)$$

Similarly, when n is eliminated from equations (1) and (4), the equation can be similarly transformed as equation (7).

$$L/c = (1/2) \times (\varphi 2w4 - \varphi 2w1)/(f4 - f1) \quad (7)$$

Equations (5D), (6), and (7) indicate that the ratio between the phase difference of two phases φ2wm (m is 1 to 4 in this case) and the frequency difference of two frequencies fm corresponds to the ratio between the distance L and the speed of light c.

Therefore, assuming that the phase difference of the two phases φ2wm is Δφ and the frequency difference of the two frequencies fm is Δf, equations (5D), (6), and (7) can be expressed as equation (8) below.

$$L/c = (1/2) \times \Delta\varphi/\Delta f \quad (8)$$

Figure 5:
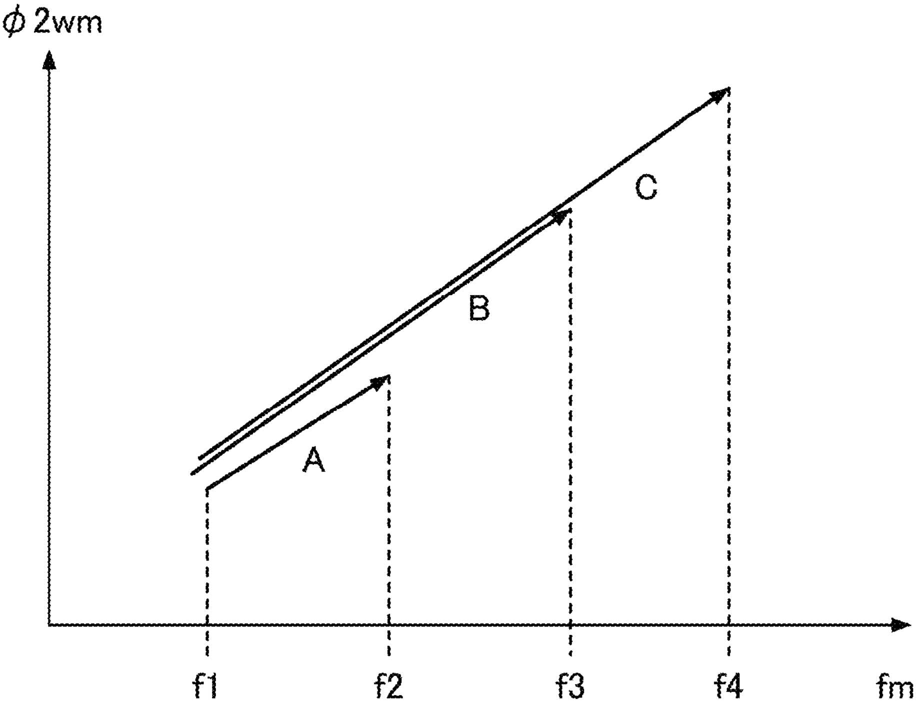
FIG. 5 illustrates a relationship between the frequency and the phase obtained by the distance measurement.

FIG. 5 is a diagram illustrating the relationship between the frequency fm and the phase φ2wm in distance measurement. If the ratio of the distance L and the speed of light c obtained by equations (5D), (6), and (7) is given as slopes A, B, and C, the slopes A, B, and C can be expressed as illustrated in FIG. 5. Specifically, the slope A is A=(½)×Δφ/Δf=(φ2w2−φ2w1)/(f2−f1). The slope B is B=(½)×Δφ/Δf=(φ2w3−φ2w1)/(f3−f1). The slope C is C=(½)×Δφ/Δf=(φ2w4−φ2w1)/(f4−f1). Note that only one of the slope A obtained from the two frequencies f1 and f2, the slope B obtained from the two frequencies f1 and f3, and the slope C obtained from the two frequencies f1 and f4, may be obtained. Further, although an embodiment of obtaining the slopes A, B, and C from the two frequencies (f1 and f2, f1 and f3, and f1 and f4), respectively, will be described here, a straight line may be obtained by the linear approximation by using the least squares method for three or more points given by the frequency fm and the phase φ2wm by using three or more frequencies, and the slope of the obtained straight line may be obtained as L/c.

The distance L obtained from the combination of the frequencies f1 and f2 can be obtained by multiplying the slope A by the speed of light c, the distance L obtained from the combination of the frequencies f1 and f3 can be obtained by multiplying the slope B by the speed of light c, and the distance L obtained from the combination of the frequencies f1 and f4 can be obtained by multiplying the slope C by the speed of light c.

As described above, the distance measurement apparatuses 100A and 100B share setting data, in which the frequency and the transmission order at the time of transmitting signals from the distance measurement apparatus 100A to the distance measurement apparatus 100B and the frequency and transmission order at the time of transmitting signals from the distance measurement apparatuses 100B to the distance measurement apparatuses 100A, are randomly set, and transmit signals between the distance measurement apparatuses 100A and 100B to perform distance measurement. The frequency and transmission order are randomly set, and, therefore, the secrecy of communication is high. Therefore, sufficient countermeasures against relay attacks can be implemented.

Therefore, it is possible to provide distance measurement apparatuses 100A (100) and 100B (100) and a method for setting transmission conditions that improve communication secrecy.

The OM 130 and the ODM 140 of the distance measurement apparatus 100A transmit and receive signals to and from the distance measurement apparatus 100B, respectively, and, therefore, in accordance with the transmission order and frequency randomly set by the setting unit 172, communication for distance measurement with high secrecy can be implemented.

Further, the distance measurement apparatus 100 includes the switching unit 174 that switches between the transmission state of the OM 130 and the reception state of the ODM 140 according to the transmission order randomly set by the setting unit 172, and, therefore, communication for distance measurement with high secrecy can be implemented while surely switching between the transmission state and the reception state.

Further, the distance measurement apparatus 100 includes the reporting unit 173 for reporting, to the distance measurement apparatus 100B, the transmission order and frequency randomly set by the setting unit 172, and, therefore, the transmission order and frequency used for distance measurement can be reported, and the transmission order and frequency can be shared by the distance measurement apparatuses 100A and 100B to implement communication for distance measurement with high secrecy.

Further, the distance measurement apparatus 100 includes the memory 178 for storing setting data in which the transmission order and frequency are randomly set, and the setting unit 172 randomly sets the transmission order and frequency by reading the setting data from the memory 178, and, therefore, communication for distance measurement with high secrecy can be implemented without communicating the transmission order and frequency.

Modified Example

Figure 6:
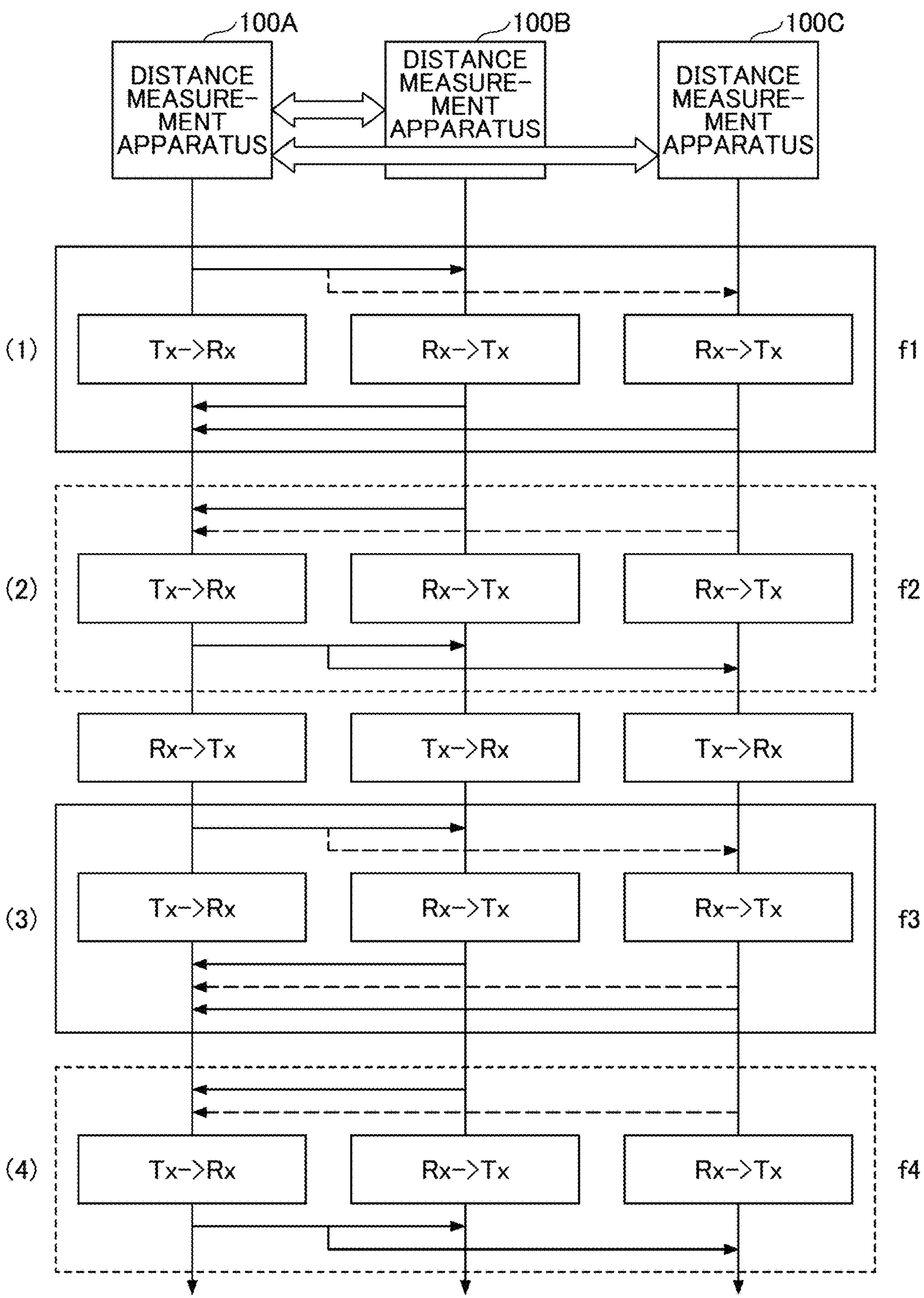
FIG. 6 is a diagram explaining a communication method for distance measurement performed according to a modified example of the embodiment.

FIG. 6 is a diagram for explaining a communication method for distance measurement executed in the modified example of the embodiment. FIG. 6 illustrates a distance measurement apparatus 100C in addition to the distance measurement apparatuses 100A and 100B. The distance measurement apparatus 100C has the same configuration as the distance measurement apparatuses 100A and 100B. Here, as an example, the distance measurement apparatus 100C performs the same operation as the distance measurement apparatus 100B. That is, the distance measurement apparatus 100C performs the same operation with respect to the distance measurement apparatus 100A, as the operation of the distance measurement apparatus 100B with respect to the distance measurement apparatus 100A. The distance measurement apparatus 100C communicates with the distance measurement apparatus 100A by a transmission order and frequency determined by the same setting data as the setting data used by the distance measurement apparatuses 100A and 100B.

Thus, the distance between the distance measurement apparatus 100A and the distance measurement apparatus 100C can be obtained. Here, a modified example in which the distance measurement apparatuses 100A and 100B and the distance measurement apparatuses 100A and 100C use the same setting data, and the distance measurement apparatus 100C performs the same operation with respect to the distance measurement apparatus 100A as the operation of the distance measurement apparatus 100B with respect to the distance measurement apparatus 100A is described. However, the setting data used by the distance measurement apparatuses 100A and 100B and the setting data used by the distance measurement apparatuses 100A and 100C may be different. That is, the distance measurement apparatus 100A may perform communication with the distance measurement apparatus 100B and perform communication with the distance measurement apparatus 100C separately in parallel. Even in this case, the distance measurement apparatus 100A can measure the distance to the distance measurement apparatus 100B and measure the distance to the distance measurement apparatus 100C.

According to an aspect of the present invention, it is possible to provide a distance measurement apparatus and a method for setting transmission conditions which improves the secrecy of communication.

Although the distance measurement apparatus and the method for setting the transmission conditions of the exemplary embodiment of the present invention have been described above, the present invention is not limited to the specifically disclosed embodiments and can be modified and changed in various ways without departing from the scope of the claims.

What is claimed is:

1. A distance measurement apparatus comprising:
a processor;
a memory storing one or more programs, which when executed, cause the processor to execute:
controlling a transmitter to transmit a signal to a device;
controlling a receiver to receive a signal from the device;
acquiring a first phase when the device receives a signal of a first frequency transmitted to the device by the distance measurement apparatus, and a second phase when the device receives a signal of a second frequency transmitted to the device by the distance measurement apparatus;
measuring a third phase when the signal of the first frequency is received from the device by the distance measurement apparatus, and a fourth phase when the signal of the second frequency is received from the device by the distance measurement apparatus;
measuring a distance to the device based on the acquired first phase and the acquired second phase, the first frequency, the measured third phase and the measured fourth phase, and the second frequency; and
setting, in a random manner, a transmission order, the first frequency, and the second frequency, the transmission order indicating an order of transmitting the signal of the first frequency by the device, transmitting the signal of the first frequency by the distance measurement apparatus, transmitting the signal of the second frequency by the device, and transmitting the signal of the second frequency by the distance measurement apparatus.

2. The distance measurement apparatus according to claim 1, wherein the processor is further caused to execute:
transmitting and receiving a signal with the device according to the transmission order, the first frequency, and the second frequency that are set in the random manner.

3. The distance measurement apparatus according to claim 1, wherein the processor is further caused to execute:
switching between a transmitting state and a receiving state, according to the transmission order set in the random manner.

4. The distance measurement apparatus according to claim 1, wherein the processor is further caused to execute:
reporting, to the device, the transmission order, the first frequency, and the second frequency that are set in the random manner.

5. The distance measurement apparatus according to claim 1, wherein the processor is further caused to execute:
storing, in a storage, setting data in which the transmission order, the first frequency, and the second frequency are set in the random manner, wherein the setting includes setting the transmission order, the first frequency, and the second frequency by reading the setting data from the storage.

6. The distance measurement apparatus according to claim 1, wherein the processor is further caused to execute:

transmitting a signal to a plurality of devices including the device, receiving a signal from the plurality of devices, acquiring a plurality of first phases when the plurality of devices receive the signal of the first frequency transmitted to the plurality of devices by the distance measurement apparatus, and a plurality of second phases when the plurality of devices receive the signal of the second frequency transmitted to the plurality of devices by the distance measurement apparatus, measuring a plurality of third phases when the signal of the first frequency is received from the plurality of devices by the distance measurement apparatus, and a plurality of fourth phases when the signal of the second frequency is received from the plurality of devices by the distance measurement apparatus, and measuring the distance to the plurality of devices based on the acquired plurality of first phases and the acquired plurality of second phases, the first frequency, the measured plurality of third phases and the measured plurality of fourth phases, and the second frequency.

7. A setting method of a transmission condition performed in a distance measurement apparatus, the setting method comprising:

transmitting, by a transmitter, a signal to a device;

receiving, by a receiver, a signal from the device;

acquiring a first phase when the device receives a signal of a first frequency transmitted to the device by the distance measurement apparatus, and a second phase when the device receives a signal of a second frequency transmitted to the device by the distance measurement apparatus;

measuring a third phase when the signal of the first frequency is received from the device by the distance measurement apparatus, and a fourth phase when the signal of the second frequency is received from the device by the distance measurement apparatus;

measuring a distance to the device based on the acquired first phase and the acquired second phase, the first frequency, the measured third phase and the measured fourth phase, and the second frequency; and setting, in a random manner, a transmission order, the first frequency, and the second frequency, the transmission order indicating an order of transmitting the signal of the first frequency by the device, transmitting the signal of the first frequency by the distance measurement apparatus, transmitting the signal of the second frequency by the device, and transmitting the signal of the second frequency by the distance measurement apparatus.

* * * * *